United States Patent
Kim

(10) Patent No.: US 8,978,471 B2
(45) Date of Patent: Mar. 17, 2015

(54) APPARATUS AND METHOD FOR DRIVING INERTIAL SENSOR

(75) Inventor: Chang Hyun Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 280 days.

(21) Appl. No.: 13/464,735

(22) Filed: May 4, 2012

(65) Prior Publication Data

US 2012/0285244 A1   Nov. 15, 2012

(30) Foreign Application Priority Data

May 13, 2011 (KR) .................. 10-2011-0045109

(51) Int. Cl.
*G01C 19/56* (2012.01)
*G01C 25/00* (2006.01)

(52) U.S. Cl.
CPC .................................. *G01C 25/005* (2013.01)
USPC .................................... 73/504.12; 73/504.02

(58) Field of Classification Search
USPC .............. 73/504.12, 504.02, 504.04, 504.03, 73/514.01, 510, 511, 1.38
See application file for complete search history.

(56) References Cited

U.S. PATENT DOCUMENTS

| | | | |
|---|---|---|---|
| 6,853,315 B2 * | 2/2005 | Schiller et al. | 340/974 |
| 2008/0234935 A1 * | 9/2008 | Wolf et al. | 701/216 |
| 2009/0007661 A1 * | 1/2009 | Nasiri et al. | 73/504.03 |
| 2009/0084180 A1 * | 4/2009 | Yoshida et al. | 73/504.02 |
| 2009/0293615 A1 * | 12/2009 | Lee | 73/514.01 |
| 2011/0146403 A1 * | 6/2011 | Rizzo Piazza Roncoroni et al. | 73/504.12 |
| 2011/0283126 A1 * | 11/2011 | Bartholomeyczik et al. | 713/323 |
| 2012/0304767 A1 * | 12/2012 | Howard et al. | 73/504.03 |
| 2013/0312520 A1 * | 11/2013 | Kho | 73/504.12 |
| 2014/0000340 A1 * | 1/2014 | Kim et al. | 73/1.38 |

* cited by examiner

*Primary Examiner* — Helen Kwok
(74) *Attorney, Agent, or Firm* — Ladas & Parry, LLP

(57) ABSTRACT

Disclosed herein are an apparatus and a method for driving an inertial sensor. The apparatus for driving an inertial sensor includes a detection unit that detects first acceleration detection voltage and detects angular velocity detection voltage when a wake up signal is input; a wake up signal generation unit that generates the wake up signal when the total of acceleration detection voltage is larger than predetermined voltage; a phase conversion unit that generates driving voltage and inversion driving voltage of the corresponding axis; a driving unit that vibrates the inertial sensor; and a control unit that performs a control to wake up the detection unit, the phase conversion unit, and the driving unit or convert them into a sleep mode according to a control signal, whereby power consumption can be minimized in an apparatus requiring low power like mobile environment.

18 Claims, 3 Drawing Sheets

APPARATUS AND METHOD FOR DRIVING INERTIAL SENSOR

CROSS REFERENCE TO RELATED APPLICATION

This application claims the benefit of Korean Patent Application No. 10-2011-0045109, filed on May 13, 2011, entitled "Apparatus And Method For Driving Inertial Sensor" which is hereby incorporated by reference in its entirety into this application.

BACKGROUND OF THE INVENTION

1. Technical Field

The present invention relates to an apparatus and a method for driving an inertial sensor.

2. Description of the Prior Art

An apparatus for driving an inertial sensor is an apparatus capable of sensing angular velocity corresponding to deformations due to acceleration and rotation motion in response to linear motions. Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like, Acceleration of the apparatus for driving an inertial sensor may be obtained by Newton's law of motion "F=ma", where "F" is force applied to an object, "m" is a mass of an object, and "a" is acceleration to be measured. Therefore, the acceleration a may be obtained by measuring force F applied to an object and dividing the measured force by a mass m of an object that is a predetermined value.

Further, angular velocity of the inertial sensor may be obtained by Coriolis force "F=2 mΩ·v", where "F" represents the Coriolis force applied to an object, "m" represents a mass of an object, "Ω" represents angular velocity to be measured, and "v" represents motion velocity of an object.

In this case, since the motion velocity v of the object and the mass m of the object are a value known in advance, the angular velocity Ω may be obtained by measuring the Coriolis force (F) applied to the object. Meanwhile, the direction of the Coriolis force F, the direction of the motion velocity v, and a reference axis of the angular velocity Ω need to form a right angle to each other.

In this case, in order to detect the angular velocity of the inertial sensor, a considerable amount of power is consumed since the angular velocity of an axis vertical to the vibration axis is measured by vibrating the inertial sensor in a direction of each axis of the inertial sensor.

Therefore, there is a problem in that the apparatus for driving an inertial sensor according to the prior art is not appropriate to use in mobile environments requiring low power.

SUMMARY OF THE INVENTION

The present invention has been made in an effort to provide an apparatus and a method for driving an inertial sensor capable of minimizing power consumption by waking up components sensing angular velocity when acceleration of a predetermined value or more is sensed from the inertial sensor.

According to a preferred embodiment, there is provided an apparatus for driving an inertial sensor, including: a detection unit that detects first acceleration detection voltage corresponding to acceleration of each axis of the inertial sensor and detects angular velocity detection voltage corresponding to angular velocity of each axis of the inertial sensor when a wake up signal is input; a wake up signal generation unit that generates the wake up signal when second acceleration detection voltage calculated from the first acceleration detection voltage of each axis is larger than predetermined reference voltage; a phase conversion unit that generates driving voltage and inversion driving voltage of the corresponding axis by shifting the first acceleration detection voltage of each axis by a predetermined phase so as to vibrate the inertial sensor in directions of each axis when the wake signal is input; a driving unit that provides the driving voltage and the inversion driving voltage of the corresponding axis to corresponding driving electrodes when the wake up signal is input so as to vibrate the inertial sensor in the directions of the corresponding axis; and a control unit that performs a control to wake up the detection unit, the phase conversion unit, and the driving unit or convert the detection unit, the phase conversion unit, and the driving unit into a sleep mode according to a control signal.

The detection unit may include: a first detector that detects the first acceleration detection voltage corresponding to the acceleration of each axis due to the deformations caused by linear motions of each axis of the inertial sensor; a second detector that detects angular velocity detection voltage corresponding to the angular velocity of each axis due to the deformations caused by Coriolis force and vibrations of each axis of the inertial sensor when the wake up signal is input; and a switching unit that is switched to disconnect the first detector from the second detector according to a control signal when the wake up signal of the control unit is absent and to connect the first detector to the second detector according to the control signal when the wake up signal of the control unit is present.

The first detector may include: a first detection amplifier that amplifies output voltage from a positive detection electrode disposed on a first axis of the inertial sensor; a second detection amplifier that amplifies output voltage from a negative detection electrode disposed on the first axis of the inertial sensor; a third detection amplifier that amplifies output voltage from a positive detection electrode disposed on a second axis of the inertial sensor; a fourth detection amplifier that amplifies output voltage from a negative detection electrode disposed on the second axis of the inertial sensor; a first detection subtracter that outputs the first acceleration detection voltage of the first axis corresponding to the first axis acceleration calculated by subtracting the output voltage from the second detection amplifier from the output voltage from the first detection amplifier; a second detection subtracter that outputs the first acceleration detection voltage of the second axis corresponding to the second axis acceleration calculated by subtracting the output voltage from the fourth detection amplifier from the output voltage from the third detection amplifier; and a first detection adder that outputs the first acceleration detection voltage of a third axis corresponding to the third axis acceleration calculated by adding the output voltage from the first detection amplifier, the output voltage from the second detection amplifier, the output voltage from the third detection amplifier, and the output voltage from the fourth amplifier.

The second detector may include: a first detection multiplier that outputs the second axis angular velocity detection voltage corresponding to the second axis angular velocity calculated by multiplying the first acceleration detection voltage of the first axis re-detected through the first detector by the third axis driving voltage due to the deformations caused by the Coriolis force and the vibrations of the third axis according to the third axis driving voltage for vibrating the inertial sensor in a direction of the third axis; a second detection multiplier that outputs the first axis angular velocity detection voltage corresponding to the first axis angular velocity calculated by multiplying the first acceleration detection voltage of the second axis re-detected through the first detector by the third axis driving voltage due to the deformations caused by the Coriolis force and the vibrations of the third axis according to the third axis driving voltage for vibrating the inertial sensor in a direction of the third axis; and a third detection multiplier that outputs the second axis angular velocity detection voltage corresponding to the second axis angular velocity calculated by multiplying the first acceleration detection voltage of the third axis re-detected through the first detector by the first axis driving voltage due to the deformations caused by the Coriolis force and the vibrations of the first axis according to the first axis driving voltage for vibrating the inertial sensor in a direction of the first axis.

The first detection multiplier may output third axis angular velocity detection voltage corresponding to the third axis angular velocity calculated by multiplying the first acceleration detection voltage of the first axis re-detected through the first detector by the second axis driving voltage due to the deformations caused by the Coriolis force and the vibrations of the second axis according to the second axis driving voltage for vibrating the inertial sensor in a direction of the second axis.

The second detection multiplier may output the third axis angular velocity detection voltage corresponding to the third axis angular velocity calculated by multiplying the first acceleration detection voltage of the second axis re-detected through the first detector by the first axis driving voltage due to the deformations caused by the Coriolis force and the vibrations of the first axis according to the first axis driving voltage for vibrating the inertial sensor in a direction of the first axis.

The third detection multiplier may output the first axis angular velocity detection voltage corresponding to the first axis angular velocity calculated by multiplying the first acceleration detection voltage of the third axis re-detected through the first detector by the second axis driving voltage due to the deformations caused by the Coriolis force and the vibrations of the second axis according to the second axis driving voltage for vibrating the inertial sensor in the direction of the second axis.

The switching unit may include: a first switch stage that is switched to disconnect or connect the first detection subtracter from or to the first detection multiplier according to the control signal of the control unit; a second switch stage that is switched to disconnect or connect the second detection subtracter from or to the second detection multiplier according to the control signal of the control unit; and a third switch stage that is switched to disconnect or connect the first detection adder from or to the third detection multiplier according to the control signal of the control unit.

The wake up signal generation unit may include: a second detection adder that outputs the second acceleration detection voltage calculated by adding the first acceleration detection voltage of each axis detected through the detection unit; a high frequency filter that is filtered to remove high frequency signals in order to remove noise from the output second acceleration detection voltage; and a comparator that generates the wake up signals when the second acceleration detection voltage is larger than the reference voltage by comparing the filtered second acceleration detection voltage with the reference voltage.

The driving unit may include: a first driving amplifier that amplifies the first axis driving voltage or the third axis driving voltage generated from the phase conversion unit and provides the amplified first axis driving voltage or the amplified third axis driving voltage to a positive driving electrode disposed on the first axis of the inertial sensor; a second driving amplifier that amplifies the first axis inversion driving voltage or the third axis inversion driving voltage generated from the phase conversion unit and provides the amplified first axis inversion driving voltage or the amplified inversion third axis driving voltage to a negative driving electrode disposed on the first axis of the inertial sensor; a third driving amplifier that amplifies the second axis inversion driving voltage or the third axis inversion driving voltage generated from the phase conversion unit and provides the amplified second axis driving voltage or the amplified third axis driving voltage to a positive driving electrode disposed on the second axis of the inertial sensor; and a fourth driving amplifier that amplifies the second axis inversion driving voltage or the third axis inversion driving voltage generated from the phase conversion unit and provides the amplified second axis driving voltage or the amplified third axis driving voltage to a negative driving electrode disposed on the second axis of the inertial sensor.

The control unit may turn off the switching unit according to the control signal when the wake up signal is absent if the angular velocity detection voltage of each axis detected from the second detector is absent for the predetermined time to perform a control to convert the second detector, the phase conversion unit, and the driving unit into a sleep mode.

According to another preferred embodiment of the present invention, there is provided a method for driving an inertial sensor, including: (A) detecting first acceleration detection voltage corresponding to acceleration of each axis of an inertial sensor by a first detector; (B) generating a wake up signal by a wake up signal generation unit when second acceleration detection voltage calculated from the first acceleration detection voltage of each axis is larger than predetermined reference voltage; and (C) detecting angular velocity detection voltage corresponding to angular velocity of each axis of the inertial sensor by the woken up second detector, the phase conversion unit, and the driving unit by receiving the wake up signal.

The method for driving an inertial sensor may further include: (D) converting the second detector, the phase conversion unit, and the driving unit to be in a sleep mode by the control unit when the angular velocity detection voltage of each axis is not detected for the predetermined time.

The (A) may include: (A-1) amplifying first output voltage from a positive detection electrode and second output voltage from a negative detection electrode disposed on a first axis of the inertial sensor by the first detector and then, outputting first acceleration detection voltage of a first axis due to the deformations caused by a linear motion of the first axis by subtracting the amplified second output voltage from the amplified first output voltage; (A-2) amplifying third output voltage from a positive detection electrode and fourth output voltage from a negative detection electrode disposed on a second axis of the inertial sensor by the first detector and then, outputting first acceleration detection voltage of a second axis due to the deformations caused by a linear motion of the second axis by subtracting the amplified fourth output voltage from the amplified third output voltage; and (A-3) adding the amplified first output voltage, the amplified second output voltage, the amplified third output voltage, and the amplified fourth output voltage by the first detector to output the first acceleration detection voltage of a third axis due to the deformations caused by a linear motion of the third axis of the inertial sensor.

The (B) may include: (B-1) calculating second acceleration detection voltage by adding the first acceleration detection voltage of each axis; (B-2) determining whether the calculated second acceleration detection voltage is larger than the reference voltage; and (B-3) generating a wake up signal when the second acceleration detection voltage is larger than the reference voltage.

The (C) may include: (C-1) generating driving voltage and inversion driving voltage of the corresponding axis by shifting the first acceleration detection voltage of each axis by a predetermined phase so as to vibrate the inertial sensor in directions of each axis by the phase conversion unit when the wake up signal is input; (C-2) vibrating the inertial sensor in the direction of the corresponding axis by providing the driving voltage and the inversion driving voltage of the corresponding axis to the corresponding driving voltage through the driving unit when the wake up signal is input; and (C-3) detecting angular velocity detection voltage corresponding to angular velocity of each axis due to the deformations caused by Coriolis force and vibrations of the corresponding axis of the inertial sensor by a second detector when the wake up signal is input.

The (C-3) may include: outputting the second axis angular velocity detection voltage corresponding to the second axis angular velocity calculated by multiplying the first acceleration detection voltage of the first axis re-detected through the first detector by the third axis driving voltage due to the deformations caused by the Coriolis force and the vibrations of the third axis according to the third axis driving voltage of the inertial sensor; outputting the first axis angular velocity detection voltage corresponding to the first axis angular velocity calculated by multiplying the first acceleration detection voltage of the second axis re-detected through the first detector by the third axis driving voltage due to the deformations caused by the Coriolis force and the vibrations of the third axis according to the third axis driving voltage of the inertial sensor; and outputting the third axis angular velocity detection voltage corresponding to the third axis angular velocity calculated by multiplying the first acceleration detection voltage of the first axis re-detected through the first detector by the second axis driving voltage due to the deformations caused by the Coriolis force and the vibrations of the second axis according to the second axis driving voltage of the inertial sensor.

The (C-3) may include: outputting the second axis angular velocity detection voltage corresponding to the second axis angular velocity calculated by multiplying the first acceleration detection voltage of the third axis re-detected through the first detector by the first axis driving voltage due to the deformations caused by the Coriolis force and the vibrations of the first axis according to the first axis driving voltage of the inertial sensor; outputting the third axis angular velocity detection voltage corresponding to the third axis angular velocity calculated by multiplying the first acceleration detection voltage of the second axis re-detected through the first detector by the first axis driving voltage due to the deformations caused by the Coriolis force and the vibrations of the first axis according to the first axis driving voltage of the inertial sensor; and outputting the first axis angular velocity detection voltage corresponding to the first axis angular velocity calculated by multiplying the first acceleration detection voltage of the third axis re-detected through the first detector by the second axis driving voltage due to the deformations caused by the Coriolis force and the vibrations of the second axis according to the second axis driving voltage of the inertial sensor.

DESCRIPTION OF THE PREFERRED EMBODIMENTS

Figure 1:
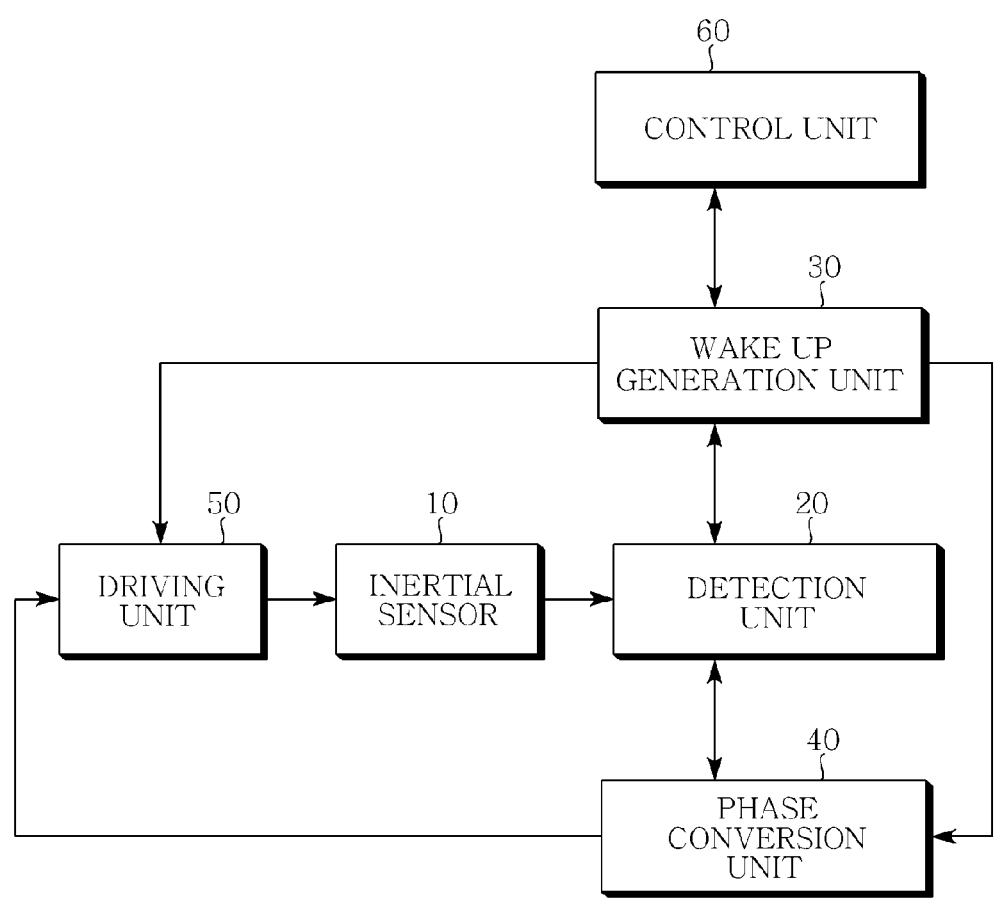
FIG. 1 is a block diagram of an apparatus for driving an inertial sensor according to a preferred embodiment of the present invention.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Terms used in the specification, 'first', 'second', etc. can be used to describe various components, but the components are not to be construed as being limited to the terms. The terms are only used to differentiate one component from other components. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 2:
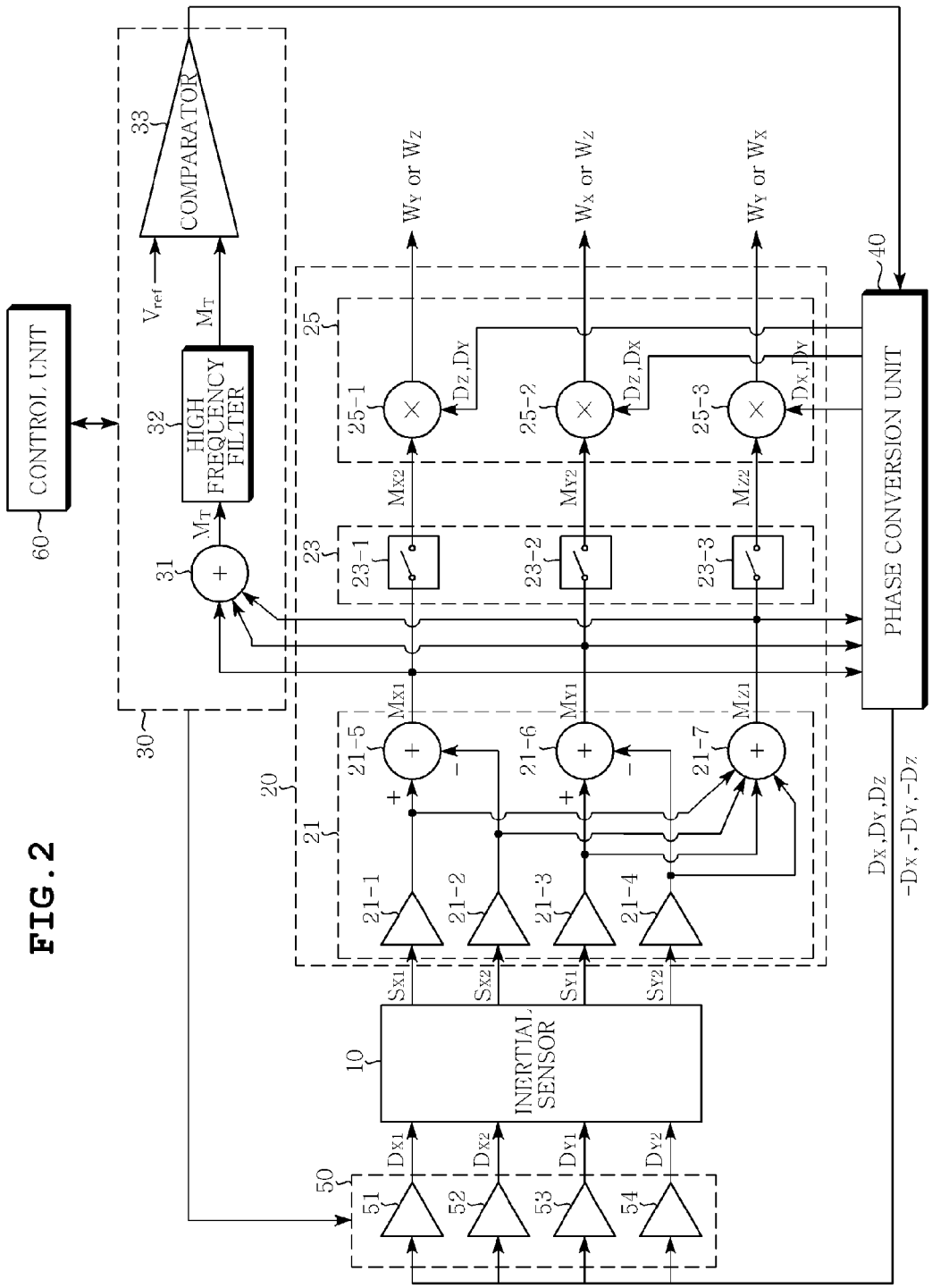
FIG. 2 is a circuit diagram of the apparatus for driving an inertial sensor shown in FIG. 1.

FIG. 1 is a block diagram of an apparatus for driving an inertial sensor according to a preferred embodiment of the present invention and FIG. 2 is a circuit diagram of the apparatus for driving an inertial sensor shown in FIG. 1.

Referring to FIGS. 1 and 2, the apparatus for driving an inertial sensor according to the preferred embodiment of the present invention is configured to include an inertial sensor 10, a detection unit 20, a wake up signal generation unit 30, a phase conversion unit 40, a driving unit 50, and a control unit 60.

The inertial sensor 10 is a sensor that senses acceleration according to a linear movement of each axis and angular velocity according to a rotation movement of each axis.

The inertial sensor 10, the detection unit 20, and the driving unit 50 may be implemented by forming a plurality of electrodes in a single piezoelectric body that is a plate-shaped structure.

For example, the detection unit 20 may be implemented by forming four detection electrodes in a piezoelectric body and the driving unit 50 may be implemented by forming four driving electrodes.

In this configuration, the four detection electrodes are configured to include a positive detection electrode (hereinafter, referred to as a 'first detection electrode') and a negative detection electrode (hereinafter, referred to as a 'second detection electrode') that are disposed on an X axis of the inertial sensor 10 and a positive detection electrode (hereinafter, referred to as a 'third detection electrode') and a negative detection electrode (hereinafter, referred to as a 'fourth detection electrode') that are disposed on a Y axis of the inertial sensor 10.

Further, the four driving electrodes are configured to include a positive driving electrode (hereinafter, referred to as a 'first driving electrode') and a negative driving electrode (hereinafter, referred to as a 'second driving electrode') that are disposed on the X axis of the inertial sensor 10 and a positive driving electrode (hereinafter, referred to as a 'third driving electrode') and a negative driving electrode (hereinafter, referred to as a 'fourth driving electrode') that are disposed on the Y axis of the inertial sensor 10.

The detection unit 20 is configured to include a first detector 21 that detects first acceleration detection voltage (for example, $M_{X1}, M_{Y1}, M_{Z1}$ or $M_{X2}, M_{Y2}, M_{Z2}$) corresponding to acceleration of each axis of the inertial sensor 10, a second detector 25 that detects angular velocity detection voltage (for example, $W_X, W_Y, W_Z$) that corresponds to angular velocity of each axis of the inertial sensor 10 when a wake up signal is input, and a switching unit 23 that connects and disconnects between the first detector 21 and the second detector 25 according to a predetermined control signal.

In this configuration, the first detector 21 is in an on state at all times, but the second detector 25 is initially in an off state (that is, a sleep/standby mode) and is then woken up according to a predetermined control signal (for example, according to whether the wake up signal is present) or, to the contrary, again reconverted from the woken up state to the off state (that is, a sleep/standby mode).

In detail, since the first detector 21 is in the on state at all times, it detects the first acceleration detection voltage corresponding to acceleration of each axis due to the deformations caused by linear motions of each axis of the inertial sensor 10.

The first detector 21 is configured to include a first detection amplifier 21-1, a second detection amplifier 21-2, a third detection amplifier 21-3, a fourth detection amplifier 21-4, a first detection subtracter 21-5, a second detection subtracter 21-6, and a first detection adder 21-7.

The first detection amplifier 21-1 amplifies and outputs the output voltage of the first detection electrode disposed on the X axis of the inertial sensor 10 and the second detection amplifier 21-2 amplifies and outputs the output voltage of the second detection electrode disposed on the X axis of the inertial sensor 10.

The third detection amplifier 21-3 amplifies and outputs the output voltage of the third detection electrode disposed on the Y axis of the inertial sensor 10 and the fourth detection amplifier 21-4 amplifies and outputs the output voltage of the fourth detection electrode disposed on the Y axis of the inertial sensor 10.

The first detection subtracter 21-5 outputs the X-axis first acceleration detection voltage $M_{X1}$ corresponding to the X-axis acceleration calculated by subtracting the output voltage from the second detection amplifier 21-2 from the output voltage from the first detection amplifier 21-2.

For example, when the output voltage of the first detection electrode, which is output from the first detection amplifier 21-1, is referred to as $S_{X1}$ and the output voltage of the second detection electrode, which is output from the second detection amplifier 21-2, is referred to as $S_{X2}$, the X-axis first acceleration detection voltage $M_{X1}$ calculated by the first detection subtracter 21-5 becomes $S_{X1}-S_{X2}$.

The second detection subtracter 21-6 outputs the Y-axis first acceleration detection voltage $M_{X1}$ corresponding to the X-axis acceleration calculated by subtracting the output voltage from the fourth detection amplifier 21-4 from the output voltage from the third detection amplifier 21-3.

For example, when the output voltage of the third detection electrode, which is output from the third detection amplifier 21-3, is referred to as $S_{Y1}$, the output voltage of the fourth detection electrode, which is output from the fourth detection amplifier 21-4 is referred to as $S_{Y2}$, the Y-axis first acceleration detection voltage $M_{Y1}$ calculated through the second detection subtracter 21-6 is $S_{Y1}-S_{Y2}$. The first detection adder 21-7 outputs the Z-axis first acceleration detection voltage $M_{Z1}$ corresponding to the Z-axis acceleration calculated by adding the output voltage $S_{X1}$ of the first detection electrode, which is output from the first detection amplifier 21-1, the output voltage $S_{X2}$ of the second detection electrode, which is output from the second detection amplifier 21-2, the output voltage $S_{Y1}$ of the third detection electrode, which is output from the third detection amplifier 21-3, and the output voltage $S_{Y2}$ of the fourth detection electrode, which is output from the fourth detection amplifier 21-4.

For example, the Z-axis first acceleration detection voltage $M_{Z1}$ calculated by the first detection adder 21-7 is $S_{X1}+S_{X2}+S_{Y1}+S_{Y2}$.

Meanwhile, when the second detector 25 is in an off state (that is, a sleep/standby mode) and is then woken up by receiving the wake up signal, it detects the angular velocity detection voltage $W_X$, $W_Y$, and $W_Z$ that correspond to the angular velocity of each axis due to the deformations caused by the Coriolis force and the vibrations of each axis of the inertial sensor 10.

The second detector 25 is configured to include a first detection multiplier 25-1, a second detection multiplier 25-2, and a third detection multiplier 25-3, as shown in FIG. 2.

The first detection multiplier 25-1 outputs the Y-axis angular velocity detection voltage $W_Y$ corresponding to the Y-axis angular velocity calculated by multiplying the X-axis first acceleration detection voltage $M_{X2}$ re-detected through the first detector 21 by Z-axis driving voltage $D_Z$, due to the deformations caused by the Coriolis force and the vibrations of the Z axis depending on the Z-axis driving voltage $D_Z$ for vibrating the inertial sensor 10 in the Z-axis direction.

Further, the first detection multiplier 25-1 may also output the Z-axis angular velocity detection voltage $W_Z$ corresponding to the Z-axis angular velocity calculated by multiplying the X-axis first acceleration detection voltage $M_{X2}$ re-detected through the first detector 21 by X-axis driving voltage $D_X$, due to the deformations caused by the Coriolis force and the Y-axis vibrations depending on the Y-axis driving voltage $D_Y$ for vibrating the inertial sensor 10 in the Y-axis direction.

The second detection multiplier 25-2 outputs the X-axis angular velocity detection voltage $W_X$ corresponding to the X-axis angular velocity calculated by multiplying the Y-axis first acceleration detection voltage $M_{Y2}$ re-detected through the first detector 21 by Z-axis driving voltage $D_Z$, due to the deformation caused by the Coriolis force and the Z-axis vibrations depending on the Z-axis driving voltage $D_Z$ for vibrating the inertial sensor 10 in the Z-axis direction.

Further, the second detection multiplier 25-2 may also output the Z-axis angular velocity detection voltage $W_Z$ corresponding to the Z-axis angular velocity calculated by multiplying the Y-axis first acceleration detection voltage $M_{Y2}$ re-detected through the first detector 21 by Y-axis driving voltage $D_Y$, due to the deformations caused by the Coriolis force and the vibrations of the X axis depending on the X-axis driving voltage $D_X$ for vibrating the inertial sensor 10 in the X-axis direction.

The third detection multiplier 25-3 outputs the Y-axis angular velocity detection voltage $W_Y$ corresponding to the Y-axis angular velocity calculated by multiplying the Z-axis first acceleration detection voltage $M_{Z2}$ re-detected through the first detector 21 by X-axis driving voltage $D_X$, due to the deformations caused by the Coriolis force and the vibrations of the X axis depending on the X-axis driving voltage $D_X$ for vibrating the inertial sensor 10 in the X-axis direction.

Further, the third detection multiplier 25-3 may also output the X-axis angular velocity detection voltage $W_X$ corresponding to the X-axis angular velocity calculated by multiplying the Z-axis first acceleration detection voltage $M_{Z2}$ re-detected through the first detector 21 by Y-axis driving voltage $D_Y$, due to the deformations caused by the Coriolis force and the vibrations of the Y axis depending on the Y-axis driving voltage $D_Y$ for vibrating the inertial sensor 10 in the Y-axis direction.

The switching unit 23 is disposed between the first detector 21 and the second detector 25, and is switched to disconnect the first detector 21 from the second detector 25 according to a predetermined control signal, that is, a control signal when the wake up signal of the control unit 60 to be described below is absent and to connect the first detector 21 to the second detector 25 according to the control signal when the wake up signal of the control unit 60 is present.

That is, when the wake up signal is absent, the switching unit 23 is in an off state to operate only the first detector 21, such that the first acceleration detection voltage of each axis is output to sense the acceleration and the second detector 25 and the phase conversion unit 40 and the driving unit 50 to be described below are in the sleep/standby mode.

On the other hand, when the wake up signal is present, the switching unit 23 is in an on state to wake up the second detector 25, the phase conversion unit 40, and the driving unit all of which are in the sleep/standby mode, thereby outputting the angular velocity voltage of each axis to sense the angular velocity.

As shown in FIG. 2, the switching unit 23 is configured to include a first switch stage 23-1, a second switch stage 23-2, and a third switch stage 23-3.

The first switch stage 23-1 is switched to disconnect or connect the second detection subtracter 21-5 from or to the second detection multiplier 25-1 according to the control signal of the control unit 60.

The second switch stage 23-2 is switched to disconnect or connect the second detection subtracter 21-6 from or to the second detection multiplier 25-2 according to the control signal of the control unit 60.

The third switch stage 23-3 is switched to disconnect or connect the first detection adder 21-7 from or to the third detection multiplier 25-3 according to the control signal of the control unit 60.

The wake up signal generation unit 30 receives the first acceleration detection voltage $M_{X1}$, $M_{Y1}$ and $M_{Z1}$ of the X axis, the Y axis, and the Z axis that are detected in the first detector 21 and generates the wake up signal when the second acceleration detection voltage $M_T = M_{X1} + M_{Y1} + M_{Z1}$ calculated therefrom is larger than a predetermined reference voltage $V_{ref}$ and provides the generated wake up signal to the switching unit 23 of the detection unit 20, the second detector 25, the phase conversion unit 40 to be described below, the driving unit 50, and the control unit 60.

In detail, the wake up signal generation unit 30 is configured to include a second detection adder 31, a high frequency filter 32, and a comparator 33 as shown in FIG. 2.

The second detection adder 31 outputs the second acceleration detection voltage $M_T = M_{X1} + M_{Y1} + M_{Z1}$ calculated by adding the first acceleration detection voltage $M_{X1}$, $M_{Y1}$, and $M_{Z1}$ of each axis detected by the first detector 21 of the detection unit 20.

The high frequency filter 32 is filtered to remove the high frequency signal, in order to remove noise from the second acceleration detection voltage $M_T = M_{X1} + M_{Y1} + M_{Z1}$.

The comparator 33 compares the filtered second acceleration detection voltage $M_T = M_{X1} + M_{Y1} + M_{Z1}$ with the reference voltage $V_{ref}$ to generate the wake up signal when the second acceleration detection voltage $M_T = M_{X1} + M_{Y1} + M_{Z1}$ is larger than the reference voltage $V_{ref}$.

The phase conversion unit 40 shifts the first acceleration detection voltage $M_{X1}$, $M_{Y1}$, and $M_{Z1}$ of the axes by a predetermined phase so as to vibrate the inertial sensor 10 in the directions of each axis when the wake up signal generated as described above is input, thereby generating the driving voltage $D_X$, $D_Y$, and $D_Z$ and inversion driving voltage $-D_X$, $-D_Y$, and $-D_Z$ so as to be provided to the driving unit 50 to be described below and the second detector 25.

For example, the phase conversion unit 40 applies the X-axis driving voltage $D_X$ that delays the X-axis first acceleration detection voltage $M_{X1}$ by 90° and the X-axis inversion driving voltage $-D_X$ that inverts the X-axis driving voltage $D_X$ by 180° to the driving unit 50 and the second detector 25 so as to vibrate the inertial sensor 10 in the X axis.

Similarly, the phase conversion unit 40 applies the Y-axis driving voltage $D_Y$ that delays the Y-axis first acceleration detection voltage $M_{Y1}$ by 90° and the Y-axis inversion driving voltage $-D_Y$ that inverts the Y-axis driving voltage $D_Y$ by 180° to the driving unit 50 and the second detector 25 so as to vibrate the inertial sensor 10 in the Y axis.

Further, the phase conversion unit 40 applies the Z-axis driving voltage $D_Z$ that delays the Z-axis first acceleration detection voltage $M_{Z1}$ by 90° and the Z-axis inversion driving voltage $-D_Z$ that inverts the Z-axis driving voltage $D_Z$ by 180° to the driving unit 50 and the second detector 25 so as to vibrate the inertial sensor 10 in the Z axis.

The driving unit 50 provides the driving voltage $D_X$, $D_Y$, and $D_Z$ and the inversion driving voltage $-D_X$, $-D_Y$, and $-D_Z$ of the corresponding axes generated from the phase conversion unit 40 to the corresponding driving electrode to vibrate the inertial sensor 10 in the direction of the corresponding axis, when the wake up signal generated as described above is input.

In detail, as shown in FIG. 2, the driving unit 50 is configured to include a first drive amplifier 51, a second drive amplifier 52, a third drive amplifier 53, and a fourth driver amplifier 54.

The first drive amplifier 51 amplifies the X-axis driving voltage $D_X$ or the Z-axis driving voltage $D_Z$ generated from the phase conversion unit 40 so as to be provided to the first driving electrode disposed on the X axis of the inertial sensor 10.

The second drive amplifier 52 amplifies the X-axis inversion driving voltage $-D_X$ of the X-axis driving voltage $D_X$ or the Z-axis inversion driving voltage $-D_Z$ of the Z-axis driving voltage $D_Z$ generated from the phase conversion unit 40 so as to be provided to the second driving electrode disposed on the X axis of the inertial sensor 10.

The third drive amplifier 53 amplifies the Y-axis driving voltage $D_Y$ or the Z-axis driving voltage $D_Z$ generated from the phase conversion unit 40 so as to be provided to the third driving electrode disposed on the Y axis of the inertial sensor 10.

The fourth drive amplifier 54 amplifies the Z-axis inversion driving voltage $-D_Z$ of the Y-axis inversion driving voltage $-D_Y$ or the Z-axis driving voltage $D_Z$ of the Y-axis driving voltage $D_Y$ generated from the phase conversion unit 40 so as to be provided to the fourth driving electrode disposed on the Y axis of the inertial sensor 10.

The control unit 60 generally controls the inertial sensor drive apparatus according to the preferred embodiment of the present invention.

The control unit 60 controls the first detector 21 of the detection unit 20 according to the control signal when the wake up signal is absent, thereby performing a control to sense the acceleration of each axis of the inertial sensor 10.

In addition, the control unit 60 controls the switching unit 23 of the detection unit 20, the second detector 25, the phase conversion unit 40, and the driving unit 50 according to the control signal when the wake up signal is present, thereby performing a control to sense the angular velocity of each axis of the inertial sensor 10.

In detail, the control unit 60 controls the on/off of the switching unit 23 so as to disconnect the first detector 21 from the second detector 25 according to the control signal when the wake up signal is absent and connect the first detector 21 to the second detector 25 according to the control signal when the wake up signal is present.

That is, the control unit 60 generates the control signal at the time of the presence of the wake up signal when the wake up signal is input from the wake up signal generation unit 30 and turns-on the switching unit 23 according to the control signal when to connect the first detector 21 to the second detector 25, thereby performing a control to wake up the second detector 25, the phase conversion unit 40, and the driving unit 50.

In addition, the control unit 60 generates the control signal at the time of the absence of the wake up signal when the angular velocity detection voltage $W_X$, $W_Y$, and $W_Z$ of each axis is not detected by the second detector 25 for a predetermined time and turns-off the switching unit 23 according to the control signal to disconnect the first detector 21 from the second detector 25, thereby again reconverting the second detector 25, the phase conversion unit 40, and the driving unit 50 to be in a the sleep/standby mode.

Figure 3:
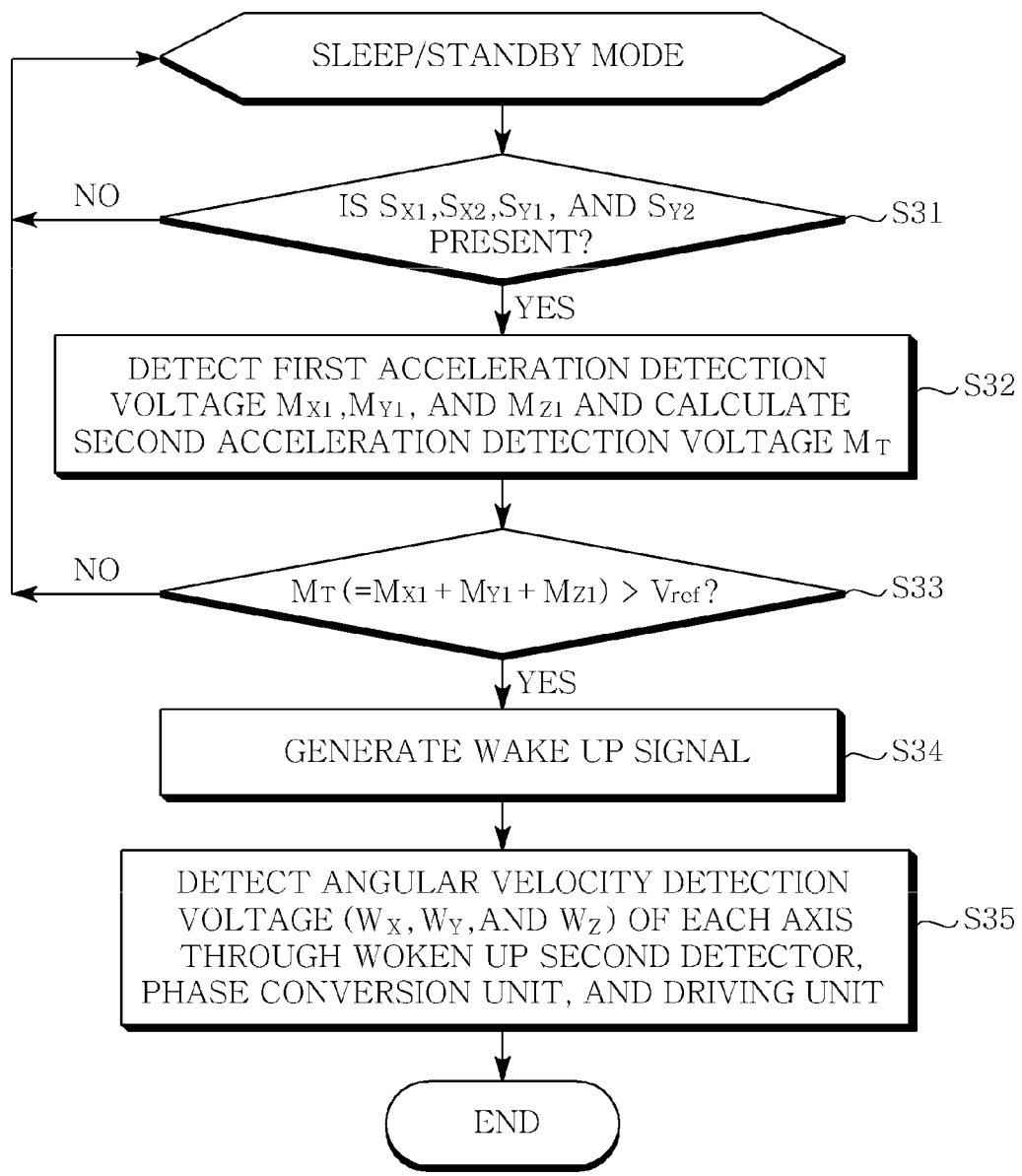
FIG. 3 is a flow chart of a method for driving an inertial sensor according to another preferred embodiment of the present invention.

FIG. 3 is a flow chart of a method for driving an inertial sensor according to another preferred embodiment of the present invention.

Referring to FIG. 3, in the method for driving an inertial sensor according to a preferred embodiment of the present invention, the control unit 60 performs a control so that the first detector 21 of the detection unit 20 determines whether the output voltage $S_{X1}$, $S_{X2}$, $S_{Y1}$, and $S_{Y2}$ output from the detection electrode of the X axis and the Y axis is present due to the deformations caused by the linear motion of each axis in the sleep/standby mode state (S31).

At step S31, when the output voltage $S_{X1}$, $S_{X2}$, $S_{Y1}$, and $S_{Y2}$ output from the detection electrode of the X axis and the Y axis is present, the first acceleration detection voltage $M_{X1}$, $M_{Y1}$, and $M_{Z1}$ corresponding to the acceleration of each axis of the inertial sensor 10 is output through the first detector 21 and the second acceleration detection voltage $M_T$ is calculated therefrom (S32).

In this case, the second acceleration detection voltage $M_T$ adds the first acceleration detection voltages may be calculated ($M_T=M_{X1}+M_{Y1}+M_{Z1}$) by adding $M_{X1}$, $M_{Y2}$, and $M_{Z2}$ of each axis by the second detection adder 31 of the wake up signal generation unit 30.

In detail, the step S32 amplifies the first output voltage from the first detection electrode and the second output voltage from the second detection electrode disposed on the X axis of the inertial sensor 10 by the first detector 21 and then subtracts the amplified second output voltage from the amplified first output voltage to output the X-axis first acceleration detection voltage $M_{X1}$ corresponding to the deformations due to the X-axis linear motion and amplifies the third output voltage from the third detection electrode and the fourth output voltage from the fourth detection electrode disposed on the Y axis of the inertial sensor 10 by the first detector 21 and then subtracts the amplified fourth output voltage from the amplified third output voltage to output the Y-axis first acceleration detection voltage $M_{Y1}$ corresponding to the deformations due to the Y-axis linear motion, and adds the amplified first output voltage, the amplified second output voltage, the amplified third output voltage, and the amplified fourth output voltage by the first detector 21 to output the Z-axis first acceleration detection voltage $M_{Z1}$ corresponding to the deformations due to the Z-axis linear motion of the inertial sensor 10.

Then, the comparator 33 of the wake up signal generation unit 30 determines whether the second acceleration detection voltage $M_T=M_{X1}+M_{Y2}+M_{Z1}$ calculated by adding the first acceleration detection voltage $M_{X1}$, $M_{Y2}$, and $M_{Z1}$ is larger than the predetermined reference voltage $V_{ref}$ (S33).

At step S33, when the second acceleration detection voltage $M_T=M_{X1}+M_{Y2}+M_{Z1}$ is larger than the reference voltage $V_{ref}$, the wake up signal is generated (S34).

Thereafter, by receiving the generated wake-up signal, the first detector 21 is connected to the second detector 25 by the switching unit 23 to detect and output the angular velocity detection voltage $W_X$, $W_Y$, and $W_Z$ corresponding to the angular velocity of each axis of the inertial sensor 10 by the woken up second detector 25, the phase conversion unit 40, and the driving unit 50 (S35).

In detail, the step S35 shifts the first acceleration detection voltage of each axis by the predetermined phase so as to the inertial sensor 10 in the directions of each axis by the phase conversion unit 40 when the wake up signal is input to generate the driving voltage $D_X$, $D_Y$, and $D_Z$ and the inversion driving voltage $-D_X$, $-D_Y$, and $-D_Z$ and detects and outputs the angular velocity detection voltage $W_X$, $W_Y$, and $W_Z$) corresponding to the angular velocity of each axis due to the deformations caused by the Coriolis force and the vibrations of the corresponding axis of the inertial sensor 10 by the second detector 25 when vibrating the inertial sensor 10 in the direction of the corresponding axis by providing the driving voltage $D_X$, $D_Y$, and $D_Z$ and the inversion driving voltage $-D_X$, $-D_Y$, and $-D_Z$ of the corresponding axis to the corresponding driving electrode through the driving unit 50.

In this case, the angular velocity detection voltage $W_X$, $W_Y$, and $W_Z$ corresponding to the angular velocity of each axis outputs the Y-axis angular velocity detection voltage $W_Y$ corresponding to the Y-axis angular velocity calculated by multiplying the X-axis first acceleration detection voltage $M_{X2}$ re-detected through the first detector 21 by the Z-axis driving voltage $D_Z$ due to the deformations caused by the Coriolis force and the vibrations of the Z axis according to the Z-axis driving voltage $D_Z$ of the inertial sensor 10 by the Z-axis driving voltage $D_Z$, the X-axis angular velocity detection voltage $W_X$ corresponding to the X-axis angular velocity calculated by multiplying the Y-axis first acceleration detection voltage $M_{Y2}$ re-detected through the first detector 21 by the Z-axis driving voltage $D_Z$ due to the deformations caused by the Coriolis force and the vibrations of the Z axis according to the Z-axis driving voltage $D_Z$ of the inertial sensor 10 by the Z-axis driving voltage $D_Z$, and the Z-axis angular velocity detection voltage $W_Z$ corresponding to the Z-axis angular velocity calculated by multiplying the X-axis first acceleration detection voltage $M_{X2}$ re-detected through the first detector 21 by the Y-axis driving voltage $D_Y$ due to the deformations caused by the Coriolis force and the vibrations of the Y axis according to the Y-axis driving voltage $D_Y$ of the inertial sensor 10 by the Y-axis driving voltage D.

Further, the angular velocity detection voltage $W_X$, $W_Y$, and $W_Z$ corresponding to the angular velocity of each axis outputs the Y-axis angular velocity detection voltage $W_Y$ corresponding to the Y-axis angular velocity calculated by multiplying the Z-axis first acceleration detection voltage $M_{Z2}$ re-detected through the first detector 21 by the Z-axis driving voltage $D_X$ due to the deformations caused by the Coriolis force and the vibrations of the Z axis according to the X-axis driving voltage $D_X$ of the inertial sensor 10 by the X-axis driving voltage $D_X$, the Z-axis angular velocity detection voltage $W_Z$ corresponding to the Z-axis angular velocity calculated by multiplying the Y-axis first acceleration detection voltage $M_{Y2}$ re-detected through the first detector 21 by the X-axis driving voltage $D_X$ due to the deformations caused by the Coriolis force and the vibrations of the X axis according to the X-axis driving voltage $D_X$ of the inertial sensor 10 by the X-axis driving voltage $D_X$, and the X-axis angular velocity detection voltage $W_X$ corresponding to the X-axis angular velocity calculated by multiplying the Z-axis first acceleration detection voltage $M_{Z2}$ re-detected through the first detector 21 by the Y-axis driving voltage $D_Y$ due to the deformations caused by the Coriolis force and the vibrations of the Y axis according to the Y-axis driving voltage $D_Y$ of the inertial sensor 10 by the Y-axis driving voltage D.

Thereafter, the control unit 60 may further include determining whether the angular velocity detection voltage $W_X$, $W_Y$, and $W_Z$ of each axis of the inertial sensor 10 detected through the second detector 25 is detected for the predetermined time and again reconverting (not shown) the woken up second detector 25, the phase conversion unit 40, and the driving unit 50 to be in the sleep/standby mode when there is no the angular velocity detection voltage $W_X$, $W_Y$, and $W_Z$ of each axis.

Meanwhile, at step S31, when there is no output voltage $S_{X1}$, $S_{X2}$, $S_{Y1}$, and $S_{Y2}$ output from the detection electrodes (for example, the first, second, third, and fourth detection electrodes) of the X axis and the Y axis, the second detector 25, the phase conversion unit 40, and the driving unit 50 return into the sleep/standby mode block shown in FIG. 3 so as to continuously the sleep/standby mode, thereby performing the following processes.

In addition, at step S33, even when the second acceleration detection voltage $M_T=M_{X1}+M_{Y2}+M_{Z1}$ is not larger than the reference voltage $V_{ref}$, the second detector 25, the phase conversion unit 40, and the driving unit 50 returns to the sleep/standby mode block shown in FIG. 3 so as to continuously the sleep/standby mode shown in FIG. 3, thereby performing the following processes.

As described above, according to the apparatus and the method for driving an inertial sensor of the preferred embodiment of the present invention, the component (for example, the first detector 21) for sensing the acceleration of each axis of the inertial sensor 10 are in an on state at all times and the components (for example, the second detector 25, the phase conversion unit 40, and the driving unit 50) for sensing the angular velocity of each axis of the inertial sensor 10 is in the sleep/standby mode to wake up the components for sensing the angular velocity only at the time of sensing the acceleration of the predetermined value or more, thereby preventing the unnecessary power consumption.

As set forth above, the preferred embodiment of the present invention can prevent the unnecessary power consumption by waking up and driving the components sensing the angular velocity in the sleep mode when the acceleration of the predetermined value or more is sensed by the components sensing the acceleration.

Although the embodiment of the present invention has been disclosed for illustrative purposes, it will be appreciated that an apparatus and a method for driving an inertial sensor according to the invention are not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. An apparatus for driving an inertial sensor, comprising:
   a detection unit that detects first acceleration detection voltage corresponding to acceleration of each axis of the inertial sensor and detects angular velocity detection voltage corresponding to angular velocity of each axis of the inertial sensor when a wake up signal is input;
   a wake up signal generation unit that generates the wake up signal when second acceleration detection voltage calculated from the first acceleration detection voltage of each axis is larger than a predetermined reference voltage;
   a phase conversion unit that generates driving voltage and inversion driving voltage of the corresponding axis by shifting the first acceleration detection voltage of each axis by a predetermined phase so as to vibrate the inertial sensor in directions of each axis when the wake signal is input;
   a driving unit that provides the driving voltage and the inversion driving voltage of the corresponding axis to corresponding driving electrodes when the wake up signal is input so as to vibrate the inertial sensor in the directions of the corresponding axis; and
   a control unit that performs a control to wake up the detection unit, the phase conversion unit, and the driving unit or convert the detection unit, the phase conversion unit, and the driving unit into a sleep mode according to a control signal.

2. The apparatus for driving an inertial sensor as set forth in claim 1, wherein the detection unit includes:
   a first detector that detects the first acceleration detection voltage corresponding to the acceleration of each axis due to deformations caused by linear motions of each axis of the inertial sensor;
   a second detector that detects the angular velocity detection voltage corresponding to the angular velocity of each axis due to deformations caused by Coriolis force and vibrations of each axis of the inertial sensor when the wake up signal is input; and
   a switching unit that is switched to disconnect the first detector from the second detector according to a control signal when the wake up signal of the control unit is absent and to connect the first detector to the second detector according to the control signal when the wake up signal of the control unit is present.

3. The apparatus for driving an inertial sensor as set forth in claim 2, wherein the first detector includes:
- a first detection amplifier that amplifies output voltage from a positive detection electrode disposed on a first axis of the inertial sensor;
- a second detection amplifier that amplifies output voltage from a negative detection electrode disposed on the first axis of the inertial sensor;
- a third detection amplifier that amplifies output voltage from a positive detection electrode disposed on a second axis of the inertial sensor;
- a fourth detection amplifier that amplifies output voltage from a negative detection electrode disposed on the second axis of the inertial sensor;
- a first detection subtracter that outputs a first acceleration detection voltage of the first axis corresponding to a first axis acceleration calculated by subtracting the output voltage from the second detection amplifier from the output voltage from the first detection amplifier;
- a second detection subtracter that outputs a first acceleration detection voltage of the second axis corresponding to a second axis acceleration calculated by subtracting the output voltage from the fourth detection amplifier from the output voltage from the third detection amplifier; and
- a detection adder that outputs a first acceleration detection voltage of a third axis corresponding to a third axis acceleration calculated by adding the output voltage from the first detection amplifier, the output voltage from the second detection amplifier, the output voltage from the third detection amplifier, and the output voltage from the fourth amplifier.

4. The apparatus for driving an inertial sensor as set forth in claim 3, wherein the second detector includes:
- a first detection multiplier that outputs the angular velocity detection voltage of the second axis corresponding to a second axis angular velocity calculated by multiplying the first acceleration detection voltage of the first axis re-detected through the first detector by the third axis driving voltage due to the deformations caused by the Coriolis force and the vibrations of the third axis according to the driving voltage of the third axis for vibrating the inertial sensor in a direction of the third axis;
- a second detection multiplier that outputs the angular velocity detection voltage of the first axis corresponding to a first axis angular velocity calculated by multiplying the first acceleration detection voltage of the second axis re-detected through the first detector by the third axis driving voltage due to the deformations caused by the Coriolis force and the vibrations of the third axis according to the third axis driving voltage for vibrating the inertial sensor in a direction of the third axis; and
- a third detection multiplier that outputs the angular velocity detection voltage of the second axis corresponding to the second axis angular velocity calculated by multiplying the first acceleration detection voltage of the third axis re-detected through the first detector by the driving voltage of the first axis due to the deformations caused by the Coriolis force and the vibrations of the first axis according to the driving voltage of the first axis for vibrating the inertial sensor in a direction of the first axis.

5. The apparatus for driving an inertial sensor as set forth in claim 4, wherein the first detection multiplier outputs the angular velocity detection voltage of the third axis corresponding to a third axis angular velocity calculated by multiplying the first acceleration detection voltage of the first axis re-detected through the first detector by the second axis driving voltage due to the deformations caused by the Coriolis force and the vibrations of the second axis according to the driving voltage of the second axis for vibrating the inertial sensor in a direction of the second axis.

6. The apparatus for driving an inertial sensor as set forth in claim 4, wherein the second detection multiplier outputs the angular velocity detection voltage of the third axis corresponding to a third axis angular velocity calculated by multiplying the first acceleration detection voltage of the second axis re-detected through the first detector by the driving voltage of the first axis due to the deformations caused by the Coriolis force and the vibrations of the first axis according to the first axis driving voltage for vibrating the inertial sensor in a direction of the first axis.

7. The apparatus for driving an inertial sensor as set forth in claim 4, wherein the third detection multiplier outputs the first axis angular velocity detection voltage corresponding to the first axis angular velocity calculated by multiplying the first acceleration detection voltage of the third axis re-detected through the first detector by the second axis driving voltage due to the deformations caused by the Coriolis force and the vibrations of the second axis according to the second axis driving voltage for vibrating the inertial sensor in the direction of the second axis.

8. The apparatus for driving an inertial sensor as set forth in claim 4, wherein the switching unit includes:
- a first switch stage that is switched to disconnect or connect the first detection subtracter from or to the first detection multiplier according to the control signal of the control unit;
- a second switch stage that is switched to disconnect or connect the second detection subtracter from or to the second detection multiplier according to the control signal of the control unit; and
- a third switch stage that is switched to disconnect or connect the detection adder from or to the third detection multiplier according to the control signal of the control unit.

9. The apparatus for driving an inertial sensor as set forth in claim 1, wherein the wake up signal generation unit includes:
- a detection adder that outputs a second acceleration detection voltage calculated by adding the first acceleration detection voltage of each axis detected through the detection unit;
- a high frequency filter that is filtered to remove high frequency signals in order to remove noise from the second acceleration detection voltage; and
- a comparator that generates the wake up signals when the second acceleration detection voltage is larger than the reference voltage by comparing the filtered second acceleration detection voltage with the reference voltage.

10. The apparatus for driving an inertial sensor as set forth in claim 1, wherein the driving unit includes:
- a first driving amplifier that amplifies the driving voltage of a first axis or the driving voltage of a third axis generated from the phase conversion unit and provides the amplified first axis driving voltage or the amplified third axis driving voltage to a positive driving electrode disposed on the first axis of the inertial sensor;
- a second driving amplifier that amplifies the inversion driving voltage of the first axis or the inversion driving voltage of the third axis generated from the phase conversion unit and provides the amplified first axis inversion driving voltage or the amplified inversion third axis driving voltage to a negative driving electrode disposed on the first axis of the inertial sensor;
a third driving amplifier that amplifies the driving voltage of a second axis or the third axis driving voltage generated from the phase conversion unit and provides the amplified second axis driving voltage or the amplified third axis driving voltage to a positive driving electrode disposed on the second axis of the inertial sensor; and
a fourth driving amplifier that amplifies the inversion driving voltage of the second axis or the third axis inversion driving voltage generated from the phase conversion unit and provides the amplified second axis driving voltage or the amplified third axis driving voltage to a negative driving electrode disposed on the second axis of the inertial sensor.

11. The apparatus for driving an inertial sensor as set forth in claim 2, wherein the control unit turns-off the switching unit according to the control signal when the wake up signal is absent if the angular velocity detection voltage of each axis detected from the second detector is absent for the predetermined time to perform a control to convert the second detector, the phase conversion unit, and the driving unit into a sleep mode.

12. A method for driving an inertial sensor, comprising:
(A) detecting first acceleration detection voltage corresponding to acceleration of each axis of an inertial sensor by a first detector;
(B) generating a wake up signal by a wake up signal generation unit when second acceleration detection voltage calculated from the first acceleration detection voltage of each axis is larger than a predetermined reference voltage; and
(C) detecting angular velocity detection voltage corresponding to angular velocity of each axis of the inertial sensor by a woken up second detector, a phase conversion unit, and a driving unit by receiving the wake up signal.

13. The method for driving an inertial sensor as set forth in claim 12, further comprising:
(D) converting the second detector, the phase conversion unit, and the driving unit to be in a sleep mode by a control unit when the angular velocity detection voltage of each axis is not detected for a predetermined time.

14. The method for driving an inertial sensor as set forth in claim 12, wherein the (A) includes:
(A-1) amplifying first output voltage from a positive detection electrode and second output voltage from a negative detection electrode disposed on a first axis of the inertial sensor by the first detector and then, outputting the first acceleration detection voltage of a first axis due to the deformations caused by a linear motion of the first axis by subtracting the amplified second output voltage from the amplified first output voltage;
(A-2) amplifying third output voltage from a positive detection electrode and fourth output voltage from a negative detection electrode disposed on a second axis of the inertial sensor by the first detector and then, outputting the first acceleration detection voltage of a second axis due to the deformations caused by a linear motion of the second axis by subtracting the amplified fourth output voltage from the amplified third output voltage; and
(A-3) adding the amplified first output voltage, the amplified second output voltage, the amplified third output voltage, and the amplified fourth output voltage by the first detector to output the first acceleration detection voltage of a third axis due to the deformations caused by a linear motion of the third axis of the inertial sensor.

15. The method for driving an inertial sensor as set forth in claim 12, wherein the (B) includes:
(B-1) calculating second acceleration detection voltage by adding the first acceleration detection voltage of each axis;
(B-2) determining whether the calculated second acceleration detection voltage is larger than the reference voltage; and
(B-3) generating a wake up signal when the second acceleration detection voltage is larger than the reference voltage.

16. The method for driving an inertial sensor as set forth in claim 12, wherein the (C) includes:
(C-1) generating driving voltage and inversion driving voltage of the corresponding axis by shifting the first acceleration detection voltage of each axis by a predetermined phase so as to vibrate the inertial sensor in directions of each axis by the phase conversion unit when the wake up signal is input;
(C-2) vibrating the inertial sensor in the direction of the corresponding axis by providing the driving voltage and the inversion driving voltage of the corresponding axis to the corresponding driving voltage through the driving unit when the wake up signal is input; and
(C-3) detecting angular velocity detection voltage corresponding to angular velocity of each axis due to deformations caused by Coriolis force and vibrations of the corresponding axis of the inertial sensor by a second detector when the wake up signal is input.

17. The method for driving an inertial sensor as set forth in claim 16, wherein the (C-3) includes:
outputting the angular velocity detection voltage of a second axis corresponding to a second axis angular velocity calculated by multiplying the first acceleration detection voltage of a first axis re-detected through the first detector by the third axis driving voltage due to the deformations caused by the Coriolis force and the vibrations of the third axis according to the driving voltage of a third axis of the inertial sensor;
outputting the angular velocity detection voltage of the first axis corresponding to a first axis angular velocity calculated by multiplying the first acceleration detection voltage of the second axis re-detected through the first detector by the third axis driving voltage due to the deformations caused by the Coriolis force and the vibrations of the third axis according to the third axis driving voltage of the inertial sensor; and
outputting the angular velocity detection voltage of the third axis corresponding to a third axis angular velocity calculated by multiplying the first acceleration detection voltage of the first axis re-detected through the first detector by a driving voltage of the second axis due to the deformations caused by the Coriolis force and the vibrations of the second axis according to the second axis driving voltage of the inertial sensor.

18. The method for driving an inertial sensor as set forth in claim 17, wherein the (C-3) includes:
outputting the second axis angular velocity detection voltage corresponding to the second axis angular velocity calculated by multiplying the first acceleration detection voltage of a third axis re-detected through the first detector by the driving voltage of a first axis due to the deformations caused by the Coriolis force and the vibrations of the first axis according to the first axis driving voltage of the inertial sensor;

outputting the third axis angular velocity detection voltage corresponding to the third axis angular velocity calculated by multiplying the first acceleration detection voltage of the second axis re-detected through the first detector by the first axis driving voltage due to the deformations caused by the Coriolis force and the vibrations of the first axis according to the first axis driving voltage of the inertial sensor; and outputting the first axis angular velocity detection voltage corresponding to the first axis angular velocity calculated by multiplying the first acceleration detection voltage of the third axis re-detected through the first detector by the second axis driving voltage due to the deformations caused by the Coriolis force and the vibrations of the second axis according to the second axis driving voltage of the inertial sensor.

* * * * *